(12) United States Patent
Lambert et al.

(10) Patent No.: US 7,979,304 B2
(45) Date of Patent: Jul. 12, 2011

(54) METHOD OF MAPPING DYNAMIC MARKET CONDITIONS TO GLOBAL MANUFACTURING SITE ANALYSIS

(75) Inventors: Don Lambert, Livermore, CA (US);
Sachin Master, San Jose, CA (US);
Douglas Reed, Buda, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1190 days.

(21) Appl. No.: 11/619,633

(22) Filed: Jan. 4, 2007

(65) Prior Publication Data

US 2008/0167939 A1    Jul. 10, 2008

(51) Int. Cl.
*G06F 17/30* (2006.01)
(52) U.S. Cl. .......................................................... 705/10
(58) Field of Classification Search ................... 705/14, 705/10
See application file for complete search history.

(56) References Cited

U.S. PATENT DOCUMENTS

| | | | |
|---|---|---|---|
| 6,591,153 B2 | 7/2003 | Crampton et al. | 700/103 |
| 6,865,542 B2 | 3/2005 | Cox et al. | 705/10 |
| 7,054,706 B2 | 5/2006 | Kempf et al. | 700/121 |
| 7,103,479 B2 | 9/2006 | Patwardhan et al. | 702/2 |
| 7,103,560 B1 | 9/2006 | Fox et al. | 705/10 |
| 7,107,112 B2 | 9/2006 | Brown | 700/100 |
| 7,302,407 B2* | 11/2007 | Bohlig et al. | 705/26 |
| 2005/0197887 A1* | 9/2005 | Zuerl et al. | 705/10 |
| 2006/0259310 A1* | 11/2006 | Everett et al. | 705/1 |

OTHER PUBLICATIONS

Colliat "OLAP, relational, and multidimensional database systems", Sep. 1996, ACM SIGMOD Record, vol. 25 Issue 3, pp. 64-68.*

* cited by examiner

*Primary Examiner* — Romain Jeanty
(74) *Attorney, Agent, or Firm* — Hamilton & Terrile, LLP; Stephen A. Terrile

(57) ABSTRACT

A system and method for automatically simulating the affect of a plurality of factors on the cost of goods sold (COGS) resulting from changes in the allocation of goods to be sold in a plurality of predetermined markets. A predetermined plurality of markets are defined, each of which is allocated a default percentage of total goods to be sold. A plurality of production sites are then defined, their associated cost factors determined, their respective output assigned to predetermined markets, and the weighted, average unit COGS for each market is then calculated. A defined market is then selected for sensitivity simulation and its associated sales allocation is iteratively decremented by a predetermined percentage for reallocation to other markets. Each market's weighted, average unit cost is recalculated after each iteration, and once reallocation is completed, the global, average unit COGS is calculated. The process is then repeated for other predetermined markets and the average rate of unit cost change is calculated. Candidate production sites are then defined, with their associated cost factors, and the process is repeated until market sensitivity simulation is completed. Unit COGS results are then generated and presented as a graphical representation of the sensitivity of the COGS to changes in the allocation of goods to be sold to one or more predetermined markets.

20 Claims, 7 Drawing Sheets

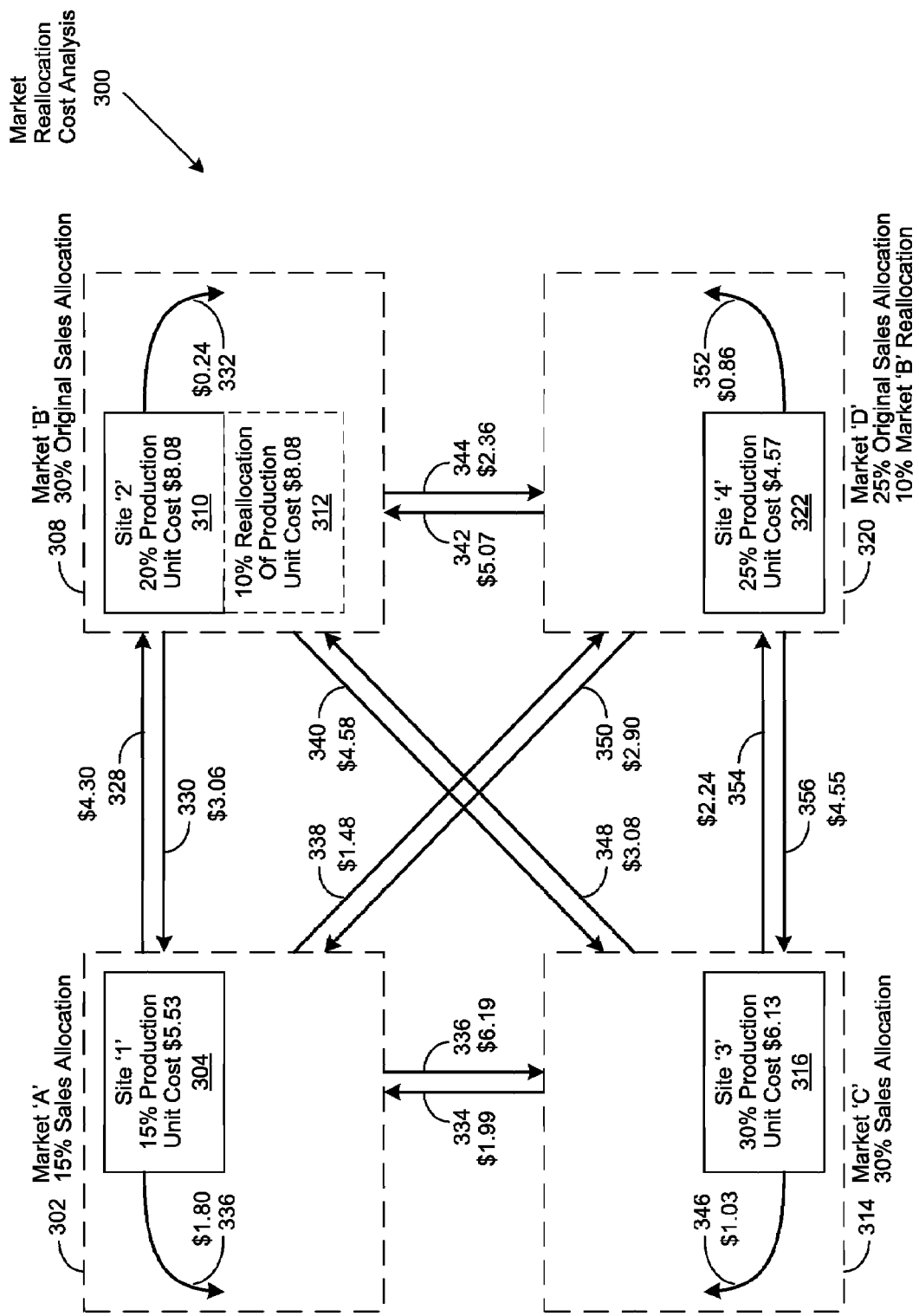
Prior Art Figure 3

500 Market Sensitivity Simulation

| Original Allocation | Originating Market | Originating Site | Production Cost | Inter-market Transportation | Intra-market Transportation | Destination Market | Total Unit Cost |
|---|---|---|---|---|---|---|---|
| 15% | 'A' | '1' | 5.53 | 0.00 | 1.80 | 'A' | 7.33 |
| 15% | 'A' | '1' | 5.53 | 4.30 | 0.24 | 'B' | 10.07 |
| 15% | 'A' | '1' | 5.53 | 6.19 | 1.03 | 'C' | 12.75 |
| 15% | 'A' | '1' | 5.53 | 1.48 | 0.86 | 'D' | 7.87 |
| 30% | 'B' | '2' | 8.08 | 3.06 | 1.80 | 'A' | 12.94 |
| 30% | 'B' | '2' | 8.08 | 0.00 | 0.24 | 'B' | 8.32 |
| 30% | 'B' | '2' | 8.08 | 4.58 | 1.03 | 'C' | 13.69 |
| 30% | 'B' | '2' | 8.08 | 2.36 | 0.86 | 'D' | 11.30 |
| 30% | 'C' | '3' | 6.13 | 1.99 | 1.80 | 'A' | 9.92 |
| 30% | 'C' | '3' | 6.13 | 1.76 | 0.24 | 'B' | 8.13 |
| 30% | 'C' | '3' | 6.13 | 0.00 | 1.03 | 'C' | 7.16 |
| 30% | 'C' | '3' | 6.13 | 2.24 | 0.86 | 'D' | 9.23 |
| 25% | 'D' | '4' | 4.57 | 1.66 | 1.80 | 'A' | 8.03 |
| 25% | 'D' | '4' | 4.57 | 5.07 | 0.24 | 'B' | 9.88 |
| 25% | 'D' | '4' | 4.57 | 4.55 | 1.03 | 'C' | 10.15 |
| 25% | 'D' | '4' | 4.57 | 0.00 | 0.86 | 'D' | 5.43 |
| 0% | 'A' | '5' | 4.74 | 0.00 | 1.80 | 'A' | 6.54 |
| 0% | 'A' | '5' | 4.74 | 4.30 | 0.24 | 'B' | 9.28 |
| 0% | 'A' | '5' | 4.74 | 6.19 | 1.03 | 'C' | 11.96 |
| 0% | 'A' | '5' | 4.74 | 1.48 | 0.86 | 'D' | 7.08 |
| 0% | 'B' | '6' | 8.92 | 3.06 | 1.80 | 'A' | 13.78 |
| 0% | 'B' | '6' | 8.92 | 0.00 | 0.24 | 'B' | 9.16 |
| 0% | 'B' | '6' | 8.92 | 4.58 | 1.03 | 'C' | 14.53 |
| 0% | 'B' | '6' | 8.92 | 2.36 | 0.86 | 'D' | 12.14 |
| 0% | 'C' | '7' | 6.49 | 1.99 | 1.80 | 'A' | 10.28 |
| 0% | 'C' | '7' | 6.49 | 1.76 | 0.24 | 'B' | 8.49 |
| 0% | 'C' | '7' | 6.49 | 0.00 | 1.03 | 'C' | 7.52 |
| 0% | 'C' | '7' | 6.49 | 2.24 | 0.86 | 'D' | 9.59 |
| 0% | 'D' | '8' | 4.33 | 1.66 | 1.80 | 'A' | 7.79 |
| 0% | 'D' | '8' | 4.33 | 5.07 | 0.24 | 'B' | 9.64 |
| 0% | 'D' | '8' | 4.33 | 4.55 | 1.03 | 'C' | 9.91 |
| 0% | 'D' | '8' | 4.33 | 0.00 | 0.86 | 'D' | 5.19 |

*Figure 5a*

| Market Reallocation | | Allocation Shift | Originating Production Site | | | | | | | |
|---|---|---|---|---|---|---|---|---|---|---|
| | | | Original Market Production Site | | | | Candidate Market Production Site | | | |
| From | To | In % | '1' ■ | '2' ● | '3' ▲ | '4' ▼ | '5' □ | '6' ○ | '7' △ | '8' ▽ |
| 'A' | 'B' | 1% | 0.0274 | | | | | 0.0183 | 0.0116 | 0.0231 |
| 'A' | 'C' | 1% | 0.0542 | | | | | 0.0720 | 0.0019 | 0.0258 |
| 'A' | 'D' | 1% | 0.0054 | | | | | 0.0481 | 0.0226 | -0.0214 |
| 'B' | 'A' | 1% | | 0.0462 | | | -0.0178 | | 0.0196 | -0.0053 |
| 'B' | 'C' | 1% | | 0.0537 | | | 0.0364 | | -0.0080 | 0.0159 |
| 'B' | 'D' | 1% | | 0.0298 | | | -0.0124 | | 0.0127 | -0.0313 |
| 'C' | 'A' | 1% | | | 0.0276 | | -0.0062 | 0.0662 | | 0.0063 |
| 'C' | 'B' | 1% | | | 0.0097 | | 0.0385 | 0.0200 | | 0.0248 |
| 'C' | 'D' | 1% | | | 0.0207 | | 0.0165 | 0.0498 | | -0.0197 |
| 'D' | 'A' | 1% | | | | 0.0260 | 0.0111 | 0.0835 | 0.0485 | |
| 'D' | 'B' | 1% | | | | 0.0445 | 0.0385 | 0.0373 | 0.0306 | |
| 'D' | 'C' | 1% | | | | 0.0472 | 0.0653 | 0.0910 | 0.0209 | |

METHOD OF MAPPING DYNAMIC MARKET CONDITIONS TO GLOBAL MANUFACTURING SITE ANALYSIS

BACKGROUND OF THE INVENTION

1. Field of the Invention

The present invention relates in general to the field of information processing and more specifically, to simulating product cost sensitivity to market demand.

2. Description of the Related Art

The globalization of today's economy has resulted in a growing interaction and interdependence between geographically dispersed manufacturers, markets and consumers. Prior to globalization, manufacturers routinely produced their products domestically, but sourced their raw materials from wherever they could be obtained at the lowest cost. Today, manufacturers are less concerned about where their products are manufactured or distributed and instead, are more focused on increasing their profit margins by reducing their overall cost of goods sold (COGS). The emergence of technological innovations, the connectivity provided by the Internet, and the availability of efficient and cost-effective transportation systems has introduced new dynamics in attaining this goal. As a result, companies now have the means to manufacture products at the lowest possible cost and market them where they will sell at the highest volume and price.

It is known to tap the potential of globalization by taking advantage of the low labor costs and specialized production capabilities of off-shore suppliers to manufacturers. All kinds of goods, ranging from discrete parts, to sub-assemblies, to complete products are produced offshore. However, despite the apparent advantages and benefits, operating in a global environment has attendant challenges. Offsetting these challenges can encompass a myriad of considerations relating to integration planning, sourcing, receiving, inventory control, manufacturing scheduling, warehousing, distribution management, customer service, and transportation.

For example, supply chains and logistics are becoming increasingly complex, sensitive to change, and expensive to manage, often requiring every aspect of the supply chain to be considered, including sources of supply, locations, shipping methods, carriers, routing and destinations. Also important is determining an optimal number, size and location of physical operations, with success or failure often hinging on making the right decisions at the right time, using existing and forecasted market metrics. Product distribution decisions can also be as demanding, especially when identifying the best transportation method from each location to establish least-cost routing for timely delivery to end customers. These decisions may be affected by a bewildering array of variables, the effects of which are many times poorly understood and only minimally reviewed and audited. Today's businesses are now realizing a need to be realistic about expectations, as these and other factors make it difficult to gain insight into the actual costs of foreign manufacturing and distribution.

SUMMARY OF THE INVENTION

In accordance with the present invention, a system and method is disclosed for automatically simulating an affect of a plurality of factors on the cost of goods sold (COGS) resulting from changes in the allocation of goods to be sold in a plurality of predetermined markets. For example, factors to be considered include whether the goods are produced domestically and exported or vice versa. In selected embodiments, a predetermined plurality of markets are defined, each of which is allocated a default percentage of total goods to be sold. A plurality of production sites are then defined, their associated cost factors determined, and their respective output assigned to predetermined markets. Associated cost factors include, but are not limited to, the cost of producing predetermined output, the cost to distribute the output to one or more predetermined markets, and the cost of complying with a plurality of predetermined mandates. A weighted, average unit cost for each market is then calculated, based on the allocated output from predetermined production sites and their respective cost factors.

A defined market is then selected for sensitivity simulation and its associated sales allocation is iteratively decremented by a predetermined percentage for reallocation to other markets. Each market's weighted, average unit cost is recalculated after each iteration, and once reallocation is completed, the global, average unit COGS is calculated. The market sensitivity simulation process is then repeated for other predetermined markets, and the average rate of unit cost change is calculated.

Additional candidate production sites are then defined, with their associated cost factors, and the market sensitivity simulation process is repeated. Once the affect of all additional production sites has been simulated, unit COGS results are generated and presented as a graphical representation of the sensitivity of the COGS to changes in the allocation of goods to be sold to one or more predetermined markets. Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 shows a generalized flow chart of a market sensitivity simulator as implemented in an embodiment of the invention;

FIGS. 5*a-c* show presentations of market sensitivity simulation as implemented in an embodiment of the invention.

DETAILED DESCRIPTION

A system and method is disclosed for automatically simulating the affect of a plurality of factors on the cost of goods sold (COGS) resulting from changes in the allocation of goods to be sold in a plurality of predetermined markets. In selected embodiments of the invention, a predetermined plurality of markets are defined, each of which is allocated a default percentage of total goods to be sold. A plurality of production sites are then defined, their associated cost factors determined, their respective output assigned to predetermined markets, and the weighted, average unit COGS for each market is calculated. A defined market is then selected for sensitivity simulation and its associated sales allocation is iteratively decremented by a predetermined percentage for reallocation to other markets. Each market's weighted, average unit cost is recalculated after each iteration, and once reallocation is completed, the global, average unit COGS is calculated. The process is then repeated for other predetermined markets and the average rate of unit cost change is calculated. Additional candidate production sites are then defined, with their associated cost factors, and the process is repeated until market sensitivity simulation is completed. Unit COGS results are then generated and presented as a graphical representation of the sensitivity of the COGS to changes in the allocation of goods to be sold to one or more predetermined markets.

Figure 1:
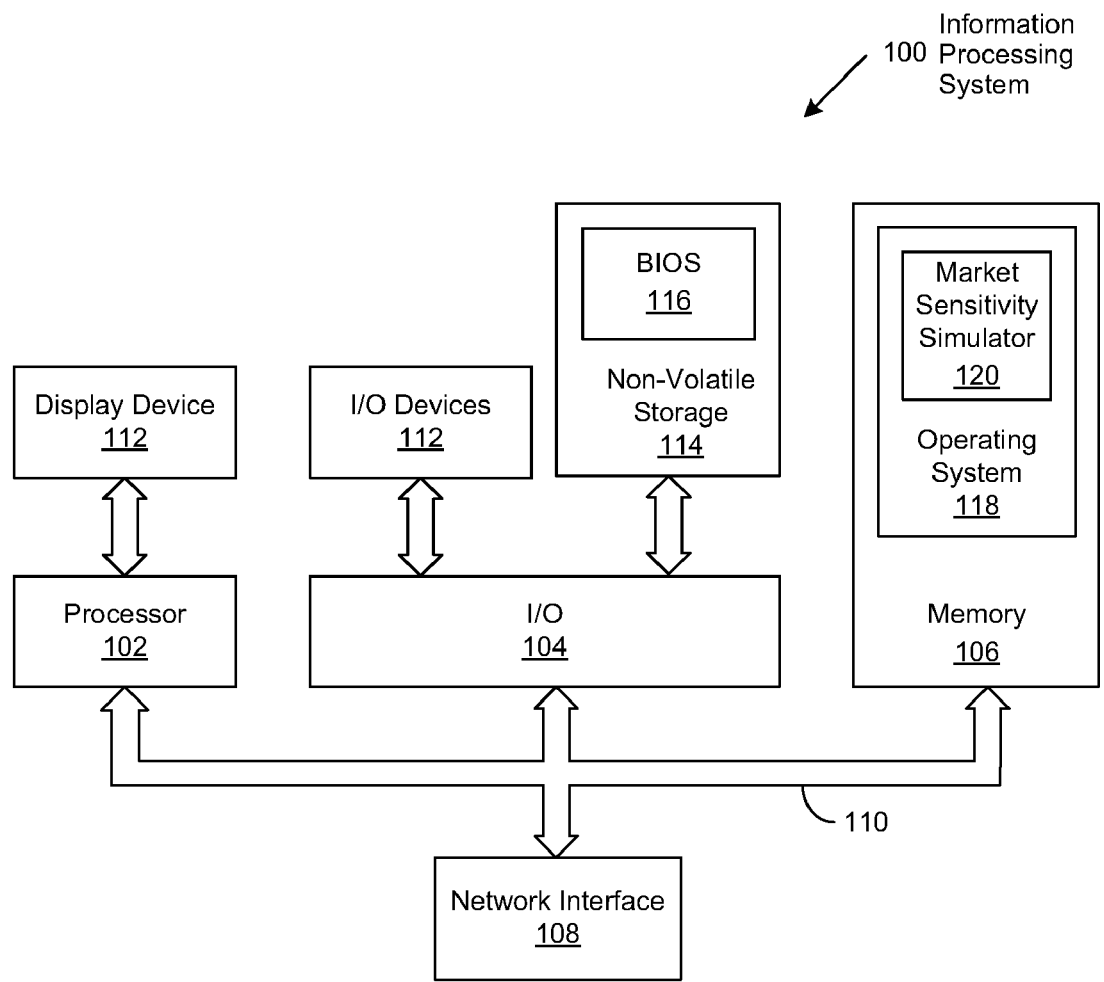
FIG. 1, labeled Prior Art, is a generalized block diagram showing a prior art market reallocation cost analysis.

FIG. 1 is a generalized block diagram showing a known market reallocation cost analysis 100. In this analysis, Market 'A' 102 comprises an original sales allocation of 15% and Production Site '1' 104. Similarly, Market 'B' 108 comprises an original sales allocation of 30% and Production Site '2' 110, Market 'C' 114 comprises an original sales allocation of 30% and Production Site '3' 116, and Market 'D' 120 comprises an original sales allocation of 25% and Production Site '4' 122. Intra-market transportation costs for delivery of output from Production Sites '1' 104, '2' 110, '3' 116, and '4' 122 are respectively $1.80 136, $0.24 132, $1.03 146, and $0.86 152 per unit. The cost of goods sold (COGS) in this analysis is determined by combining the cost of production with the cost of transportation to a predetermined market. For example, the COGS for a domestically produced unit destined for delivery to Market 'A' 102 would be the Production Site '1' 104 unit production cost of $5.53 plus intra-market transportation costs of $1.80 136 for a total of $7.33. Production sites with available capacity serving underperforming domestic markets can also serve foreign markets at the cost of incurring extra-market (i.e., export) transportation costs. In this market reallocation cost analysis, extra-market transportation costs from Market 'A' 102 to Markets 'B' 108, 'C' 114 and 'D' 120 are respectively $4.30 128, $6.19 136, and $1.48 138 per unit. Likewise, extra-market transportation costs from Market 'B' 108 to Markets 'A' 102, 'C' 114 and 'D' 120 are respectively $3.06 130, $4.58 140, and $2.36 144 per unit. Similarly, extra-market transportation costs from Market 'C' 114 to Markets 'A' 102, 'B' 108 and 'D' 120 are respectively $1.99 134, $3.08 148, and $2.24 154 per unit. In a like manner, extra-market transportation costs from Market 'D' 120 to Markets 'A' 102, 'B' 108 and 'C' 114 are respectively $2.90 150, $5.07 142, and $4.55 156 per unit.

In this analysis, Market 'B' 108 originally received a 30% sales allocation, but demand has decreased with the result that Market 'B' 108 is only performing at 20% of total sales. As a consequence, Production Site '2' 110 has excess capacity 112 which can be allocated to serve markets where demand has increased. For example, demand has increased in Market 'D' 120 from its original 25% allocation of sales to 35%., yet Production Site '4' 122 is operating at capacity. However, reallocation of capacity 112 from Site '2' 110 to serve the increased demand of Market 'D' 120 will increase the COGS in that market, as well as the global, average unit COGS. Current COGS for Market 'D' 120 comprises Site '4' 122 production cost of $4.57 and domestic transportation costs of $0.86 for a total of $5.43 per unit. COGS for reallocated capacity 412 from Production Site '2' 110 to Market 'D' 120 comprises Site '2' (112) production cost of $8.08, extra-market transportation costs of $2.36 144, and intra-market transportation costs of $0.86 152 for a total of $11.30 per unit. Furthermore, incurrence of extra-market transportation costs raises the average per-unit COGS for Market 'D' 120 from $5.43 to $7.11 and the average unit COGS for combined Markets 'A' 102, 'B' 108, C314 and 'D' 120 from $7.10 to $9.66. It will be apparent to those of skill in the art that while this approach is sufficient for determining the affect on COGS from reallocation of output capacity from an underutilized production site to a foreign market, it does not simulate market sensitivity when all current production sites are at capacity and new production sites need to be implemented to accommodate shifts or growth in market demand.

Figure 2A:
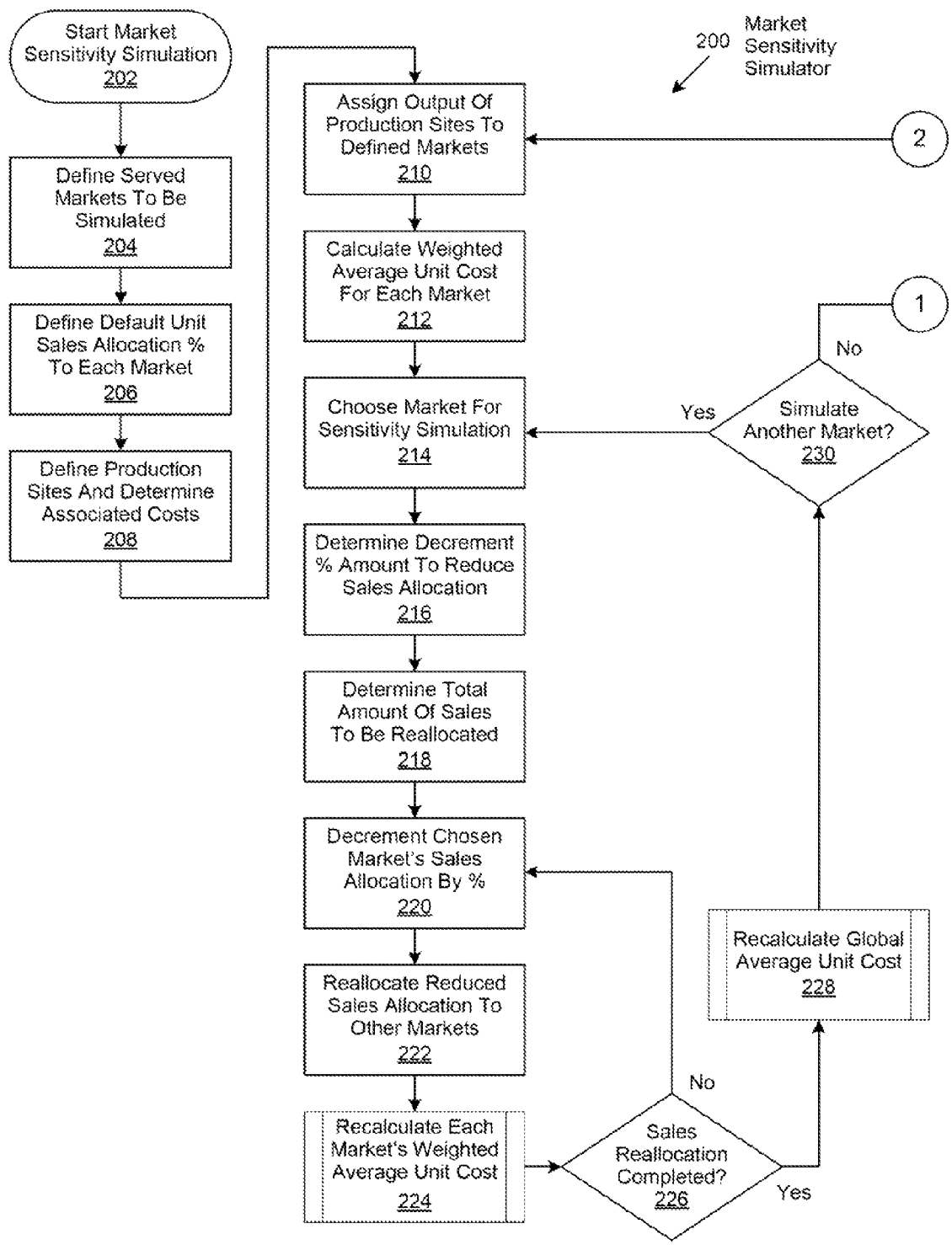
FIGS. 2*a-b* are a generalized illustration of an information processing system that can be used to implement the system and method of the present invention.
Figure 2B:
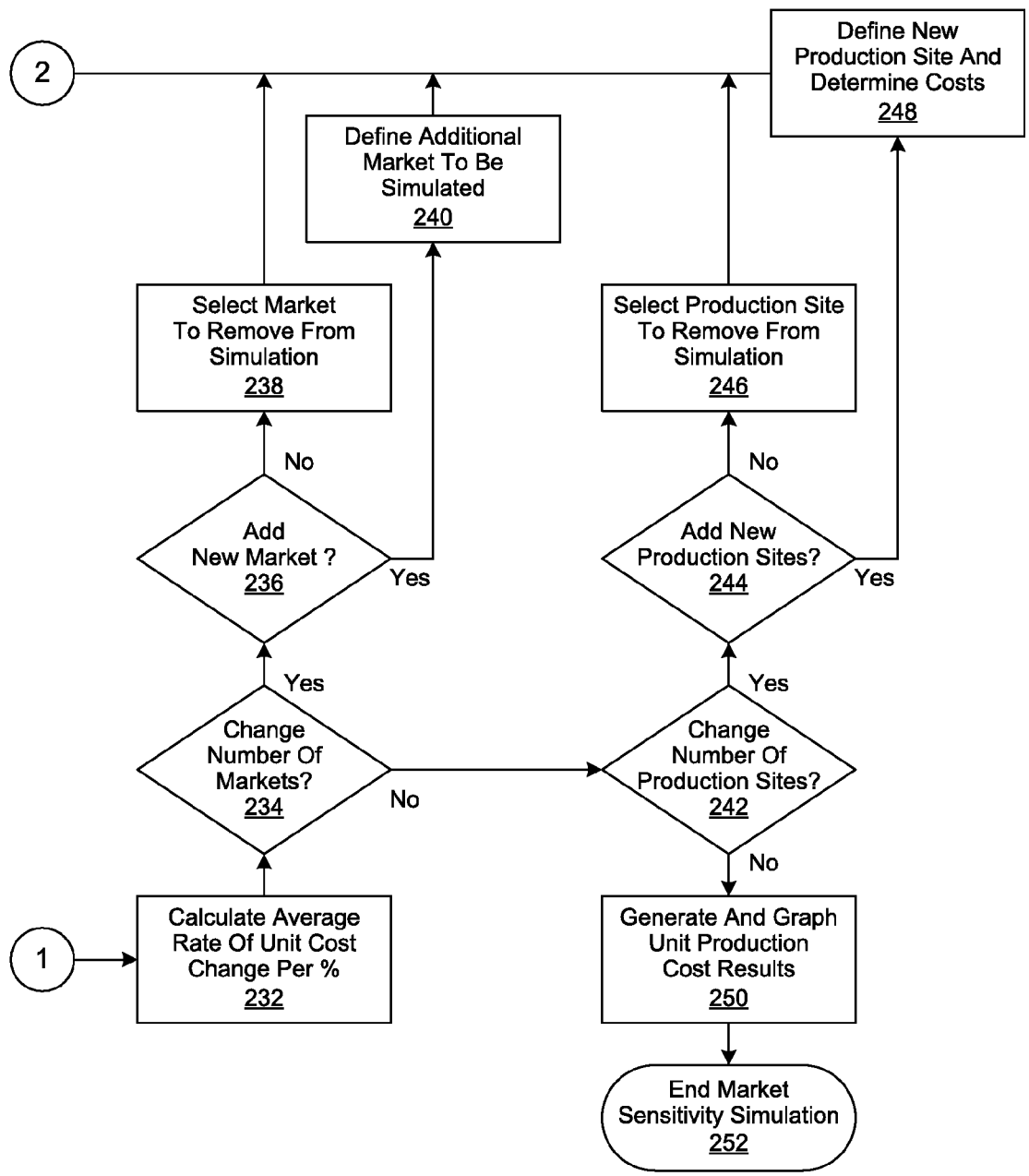

Referring to FIG. 2, a block diagram of information processing system 200 is shown. The information processing system 200 includes a processor 202, input/output (I/O) control device 204 which is coupled to I/O devices 212 such as a keyboard, sensor pad, etc. and memory 206 including volatile memory such as random access memory (RAM), and non-volatile memory such as a hard disk drive. The processor 202, I/O controller 204, memory 206 and network interface 208 are interconnected via one or more buses 210. The processor 202 is also configured to be coupled to a display device 212, such as a multi-line display, a graphical display, a touch-sensitive display, etc. The memory 106 BIOS 220 as well as operating system 218 and market sensitivity simulator 220, which may be executed on the processor 202.

FIGS. 3a-b show a generalized flow chart of a market sensitivity simulator (MSS) 300 as implemented in an embodiment of the invention. In selected embodiments of the invention, market sensitivity simulation is begun in step 302, with markets to be simulated defined in step 304. A predetermined, default percentage of total goods to be sold is then allocated to each of the markets defined in step 306. Production sites are then defined, and their associated cost factors are determined in step 308, with their respective output assigned to the markets defined in step 310. Associated cost factors include, but are not limited to, the cost of producing predetermined output, the cost to distribute the output to one or more predetermined markets, and the cost of complying with a plurality of predetermined mandates. The cost of producing predetermined output further comprises the cost of implementing a predetermined production environment, the cost of production once the production environment is implemented, and the financial risk of maintaining unused production material in inventory. The cost of production further comprises the cost of packaging goods produced within the production environment prior to distribution. The cost of distribution further comprises costs to store finished goods prior to distribution, intra-market and extra-market transportation costs to deliver completed goods to a predetermined market, and cross-border import duties. The weighted, average unit cost for each market is calculated in step 312, based on the allocated output from predetermined production sites and their respective cost factors. A defined market is then selected for sensitivity simulation in step 314. The percentage amount the selected market's sales allocation will be iteratively decremented for reallocation during sensitivity simulation is determined in step 316 and the total amount of its allocation to be reallocated is determined in step 318.

In step 320, the selected market's sales allocation is decremented by the predetermined percentage and reallocated to other predetermined markets in step 322. After reallocation, each market's resulting weighted, average unit cost is recalculated in step 324. If it is determined in step 326 that there is sales allocation remaining to be reallocated, then the process continues, beginning with step 320. Once if is determined in step 326 that reallocation is completed, the global, average unit cost is calculated in step 328. If it is determined in step 330 to simulate the sensitivity of another market, then the process is repeated, beginning in step 314. Otherwise, the average rate of unit cost change, per each percentage point of sales allocation that is reallocated from the selected market, is calculated in step 332.

If it is determined in step 334 to change the number of markets to be simulated, then it is determined in step 336 whether to add a new market to the market sensitivity simulation. If it is determined in step 336 to add a new market, then an additional market to be simulated is defined in step 340 and the process is repeated, beginning with step 310. However, if it is determined in step 336 to not add a new market, then a market is selected in step 338 to remove from the market sensitivity simulation and the process is repeated, beginning with step 310. If it is determined in step 334 to not change the number of markets to be simulated, then it is determined in step 342 whether to change the number of production sites in the market sensitivity simulation. If it is determined in step 342 to change the number of production sites, then it is determined in step 344 whether to add a new production site. If it is determined in step 344 to add a new production site to the market sensitivity simulation, then a new production site and its associated cost factors is defined in step 348 and the process is repeated, beginning with 310. However, if it is determined in step 344 to not add a new production site, then a production site is selected in step 346 to remove from the market sensitivity simulation and the process is repeated, beginning with step 310. If it is determined in step 342 to not change the number of production sites, then the unit COGS results are generated and graphed in step 350 and the market sensitivity simulation is ended in step 352.

Figure 4:
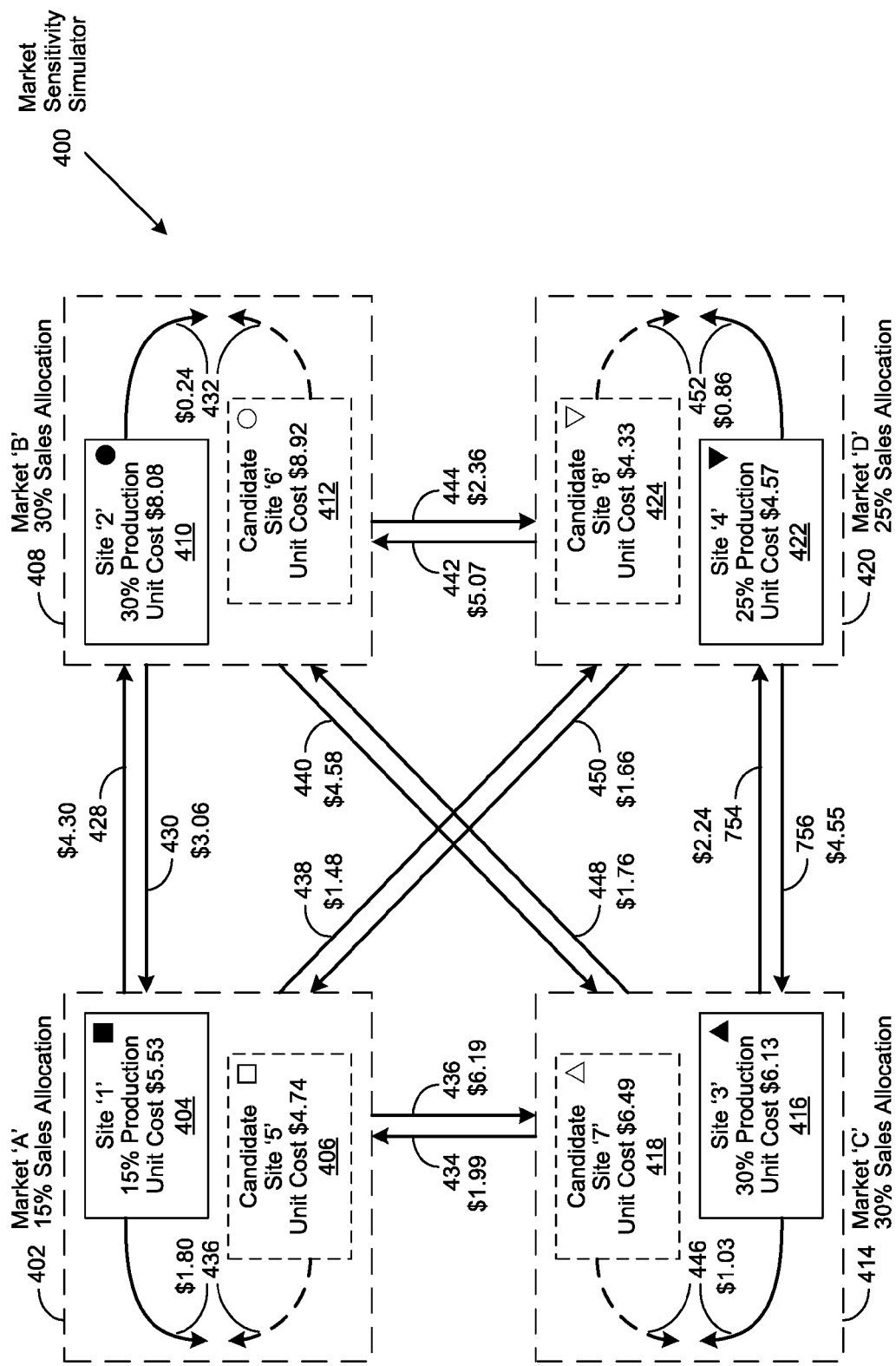
FIG. 4 is a generalized block diagram showing a market sensitivity simulator as implemented in an embodiment of the invention.

FIG. 4 is a generalized block diagram showing a market sensitivity simulator 400 as implemented in an embodiment of the invention. In this embodiment, Market 'A' 402 comprises an original sales allocation of 15% and Production Site '1' 404. Similarly, Market 'B' 408 comprises an original sales allocation of 30% and Production Site '2' 410, Market 'C' 414 comprises an original sales allocation of 30% and Production Site '3' 416, and Market 'D' 420 comprises an original sales allocation of 25% and Production Site '4' 422. Intra-market transportation costs for delivery of output from Production Sites '1' 404, '2' 410, '3' 416, and '4' 422 are respectively $5.53 336, $0.24 332, $1.03 346, and $0.86 352 per unit. In this embodiment, the cost of goods sold (COGS) is determined by combining the cost of production with the cost of transportation to a predetermined market. For example, the COGS for a domestically produced unit destined for delivery to Market 'A' 402 would be the Production Site '1' 404 unit production cost of $5.53 plus intra-market transportation costs of $1.80 336 for a total of $7.73.

Production sites with available capacity serving underperforming domestic markets can also serve foreign markets at the cost of incurring extra-market transportation costs. In this embodiment, extra-market transportation costs from Market 'A' 402 to Markets 'B' 408, 'C' 414 and 'D' 420 are respectively $4.38 428, $6.19 436, and $1.48 438 per unit. Likewise, extra-market transportation costs from Market 'B' 408 to Markets 'A' 402, 'C' 414 and 'D' 420 are respectively $3.06 430, $4.58 440, and $2.36 444 per unit. Similarly, extra-market transportation costs from Market 'C' 414 to Markets 'A' 402, 'B' 408 and 'D' 420 are respectively $1.99 434, $3.08 448, and $2.24 454 per unit. In a like manner, extra-market transportation costs from Market 'D' 420 to Markets 'A' 402, 'B' 408 and 'C' 414 are respectively $2.90 450, $5.07 442, and $4.55 456 per unit.

In this embodiment of the invention, the affect on the average unit COGS can be simulated, both globally and for a predetermined market, if Production Sites '5' 406, '6' 412, '7' 414 and '8' 424 are implemented to accommodate reallocation of sales from one market to another. For example, if demand is shifting from Market 'B' 408 to Market 'D' 420, yet Production Site '4' 322 is operating at capacity, then excess capacity from Production Site '2' 410 can be reallocated to serve Market 'D' 420. However, reallocation of excess capacity from Site '2' 410 to serve the increased demand of Market 'D' 320 will increase the average unit COGS, both globally and in that market. Alternatively, Production Site '8' 424 can be implemented in Market 'D' 420 to avoid incurring extra-market transportation costs of $2.36 444 per unit.

Figures 5B, 5C:
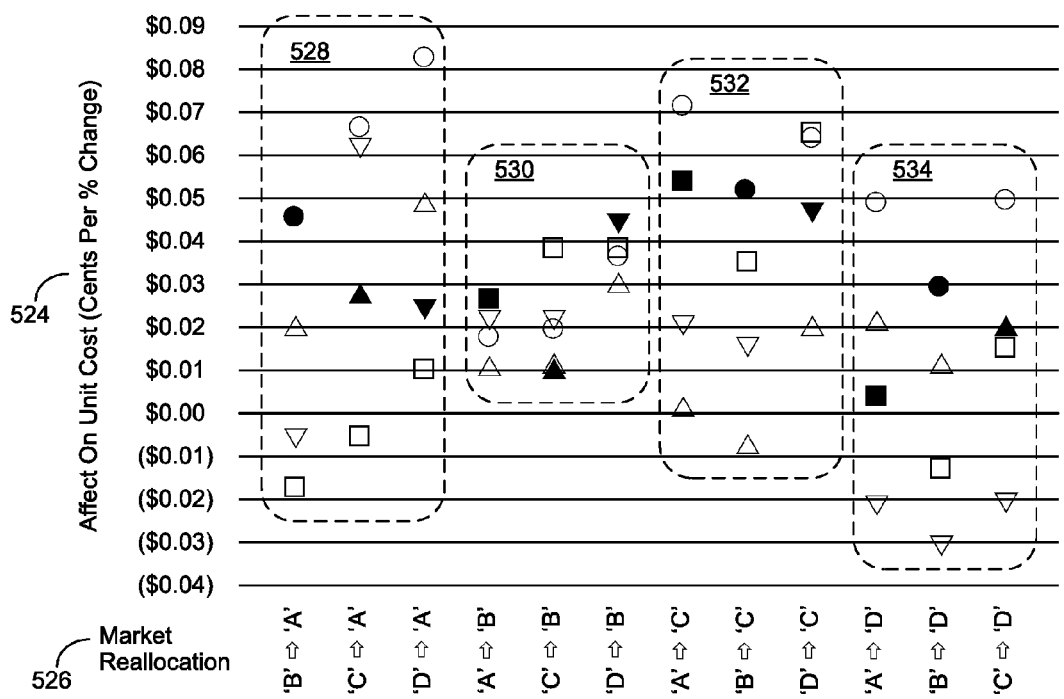

FIGS. 5a-c show a market sensitivity simulation 500 as implemented in an embodiment of the invention. FIG. 5a shows a table of cost factors used by a market sensitivity simulator in an embodiment of the invention. In this embodiment, cost factors comprise the original sales allocation 503 for each market, originating market 504 where demand is declining, originating production site 506, and associated, per-unit production cost 508. The cost factors further comprise extra-market transportation costs per unit 510, intra-market transportation costs per unit 512, destination market 514 where demand is increasing, and total unit cost 516.

FIG. 5b shows a table depicting the affect on the average, global COGS for each percentage shift in allocation of sales from a first market to a second market, resulting from the cost factors shown in FIG. 5a. The table comprises market reallocation 518 from a first market to a second market, the percentage shift in reallocation 520 between the markets, and the resulting affect on average, global COGS for predetermined production sites 522.

FIG. 5c shows a graphical, market sensitivity depiction of the affect on the average, global COGS as a result of simulating a plurality of production sites to accommodate the reallocation of sales from a first market to a second market. In this embodiment, the graphical depiction uses the simulation data comprising the table shown in FIG. 5a to plot the affect on the average, global unit cost 524 for each production site, relative to the reallocation of sales from a first market to a second market 526. It will be appreciated by those of skill in the art that use of the graphical depiction facilitates the identification of those production sites that have the most beneficial affect on the average, global COGS. For example, increases in demand in Market 'A' 528 have the most negative affect on average, global COGS, which can be mitigated by implementing Production Site '5', which has the least negative affect. Similarly, increases in demand in Market 'B' 530 show the least negative affect on average, global COGS, which can be further mitigated by implementing Production Site '7'. Likewise, implementation of Production Site '7' can also mitigate negative affects on average, global COGS as a result of increases in demand in Market 'C' 530, thereby making it an attractive choice when demand increases in Market 'B', 'C', or both. Conversely, implementation of Production Site '8' not only mitigates negative affects on average, global COGS as a result of increases in demand in Market 'D' 534, but actually lowers average, global COGS. Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A system for simulating an affect of a plurality of factors on the cost of goods sold (COGS) in a plurality of markets, comprising:
   a computer system;
   data representing a predetermined plurality of markets, the data representing markets comprising a predetermined allocation of goods to be sold;
   data representing a plurality of predetermined cost factors, the data representing cost factors comprising:
   data representing a cost to produce predetermined output from one or more predetermined production environments;
   data representing a cost of distributing the predetermined output to a plurality of predetermined markets; and
   data representing a cost of complying with a plurality of predetermined mandates, and;
   an analysis engine operable to simulate an affect on the COGS resulting from changes in the allocation of goods to be sold in a plurality of predetermined markets and taking into consideration the plurality of cost factors, the analysis engine executing on the computer system.

2. The system of claim 1, wherein the cost to produce predetermined output comprises the cost of implementing a predetermined production environment.

3. The system of claim 2, wherein the cost to produce predetermined output comprises the cost of production within a predetermined production environment.

4. The system of claim 3, wherein the cost of production comprises the cost of packaging goods produced within a predetermined production environment.

5. The system of claim 1, wherein the cost to produce predetermined output comprises the cost of unused production materials in inventory.

6. The system of claim 5, wherein the cost of unused production material in inventory comprises financial risk.

7. The system of claim 1, wherein the cost of distribution comprises the cost to store goods produced in a predetermined production environment prior to being transported to a predetermined market.

8. The system of claim 1, wherein the cost of distribution comprises the cost to transport goods produced in a predetermined production environment to a predetermined market.

9. The system of claim 8, wherein the cost to transport goods comprises cross-border import duties.

10. The system of claim 1, wherein the simulated affect on the COGS comprises a graphical representation of the sensitivity of the COGS to changes in the allocation of goods to be sold to one or more predetermined markets.

11. A method for simulating an affect of a plurality of factors on the cost of goods sold (COGS) in a plurality of markets, comprising:
    data representing a predetermined plurality of markets, the data representing markets comprising a predetermined allocation of goods to be sold;
    data representing a plurality of predetermined cost factors, the data representing cost factors comprising:
    data representing a cost to produce predetermined output from one or more predetermined production environments;
    data representing a cost of distributing the predetermined output to a plurality of predetermined markets; and
    data representing a cost of complying with a plurality of predetermined mandates, and;
    an analysis engine, executing on a computer system, operable to simulate an affect on the COGS resulting from changes in the allocation of goods to be sold in a plurality of more predetermined markets and taking into consideration the plurality of predetermined cost factors.

12. The method of claim 11, wherein the cost to produce predetermined output comprises the cost of implementing a predetermined production environment.

13. The method of claim 12, wherein the cost to produce predetermined output comprises the cost of production within a predetermined production environment.

14. The method of claim 13, wherein the cost of production comprises the cost of packaging goods produced within a predetermined production environment.

15. The method of claim 11, wherein the cost to produce predetermined output comprises the cost of unused production materials in inventory.

16. The method of claim 15, wherein the cost of unused production material in inventory comprises financial risk.

17. The method of claim 11, wherein the cost of distribution comprises the cost to store goods produced in a predetermined production environment prior to being transported to a predetermined market.

18. The method of claim 11, wherein the cost of distribution comprises the cost to transport goods produced in a predetermined production environment to a predetermined market.

19. The method of claim 18, wherein the cost to transport goods comprises cross-border import duties.

20. The method of claim 11, wherein the simulated affect on the COGS comprises a graphical representation of the sensitivity of the COGS to changes in the allocation of goods to be sold to one or more predetermined markets.

* * * * *